J. SCHMITT.
DEVICE FOR FACILITATING THE EMPLACEMENT AND DISPLACEMENT OF FLEXIBLE TIRES.
APPLICATION FILED APR. 9, 1920.
1,405,872.
Patented Feb. 7, 1922.
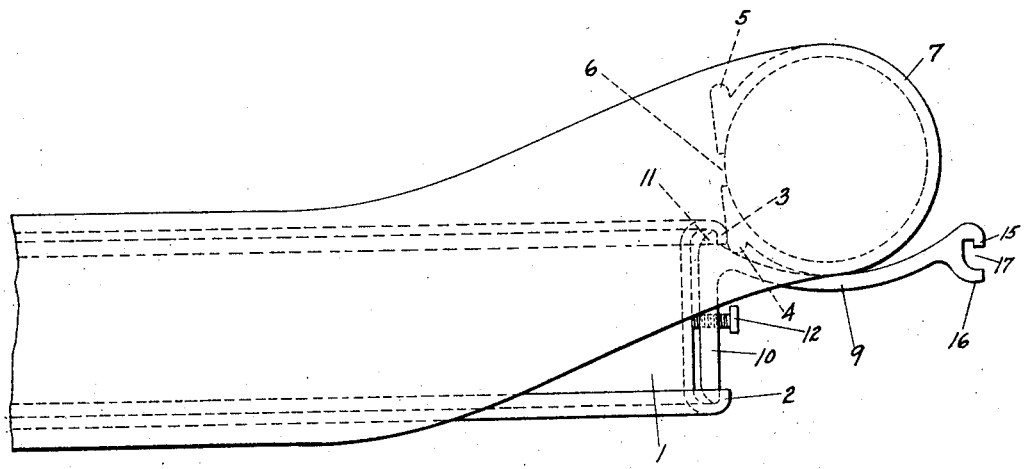
Fig. I
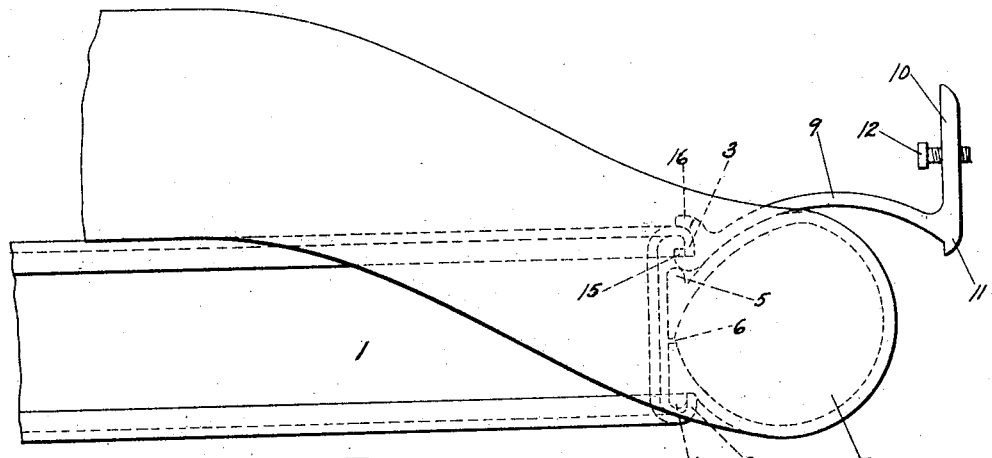
Fig. II
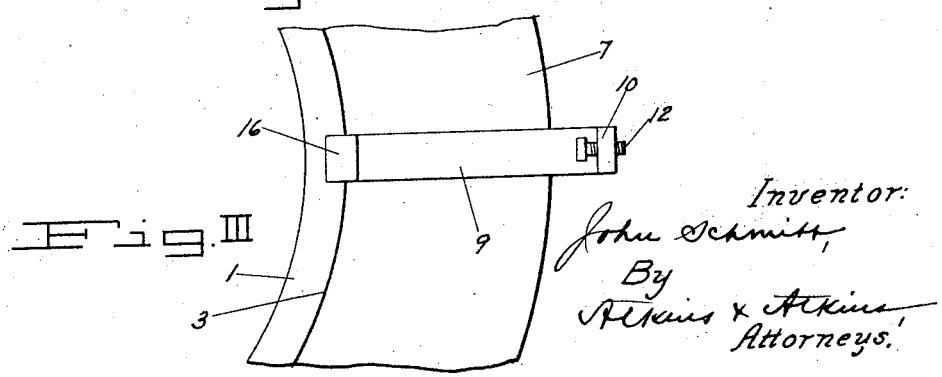
Fig. III
Inventor:
John Schmitt,
By
Atkins & Atkins
Attorneys.

UNITED STATES PATENT OFFICE.

JOHN SCHMITT, OF PORTLAND, OREGON.

DEVICE FOR FACILITATING THE EMPLACEMENT AND DISPLACEMENT OF FLEXIBLE TIRES.

1,405,872.  Specification of Letters Patent.  Patented Feb. 7, 1922.

Application filed April 9, 1920. Serial No. 372,515.

*To all whom it may concern:*

Be it known that I, JOHN SCHMITT, a citizen of the United States of America, and resident of Portland, in the county of Multnomah, in the State of Oregon, have invented certain new and useful Improvements in Devices for Facilitating Emplacement and Displacement of Flexible Tires, of which the following is a specification, reference being had to the accompanying drawing.

My invention relates to devices for facilitating the application of a flexible tire,—for example an automobile rubber tire,—to its wheel rim and also for facilitating removal of one from the other.

In practice, it is a difficult, tedious and laborious operation to apply one of the heavy, stiff rubber tires to the rim of a wheel, and even more difficult to remove an old tire from a rim, particularly after it has been attached thereto for a considerable length of time in service.

The difficulty in each case arises largely from the nature of the tire itself. It being made of heavy rubber and possessing a powerful resiliency tends, as fast as it is forced out of place or into place as the case may be at one point and the attempt is made to carry the operation to another point along the periphery of the wheel, to undo the work accomplished at the first point in the attempt to carry it forward to the second point. In other words, if the operation attempted be that of removing a tire, the operator, by the aid of a lever, pries the tire away from the rim at one point. If then he attempts to carry the separation further, the tire will slip back into place at the first point, and so on until, by dint of effort and contrivance, he is able to separate a sufficient length of tire from the rim to overcome the adverse action above indicated due to the resiliency of the tire.

Again, in applying a tire, whether new or old, to its rim, it is a simple matter, for example, to lay the wheel on the ground and to set the tire in place upon the rim at one point, but the difficulty arises again in overcoming the resiliency of the tire which, in the operation of emplacement, tends to spring away from the rim and to undo the work accomplished at one point as fast as it is attempted to carry it forward to another point.

My invention comprises a temporary tire retaining member which, being applied to the rim,—preferably in one of two ways in which it is adapted to be applied, as the case demands,—affords a positive stop action against the resilient force of the tire so as to hold it in a fixed position at one point while the operator is proceeding to manipulate it at another point. In the operation of emplacement of a tire, also, the said member acts as a stop to prevent the slipping of the tire peripherically about the rim during such time as the tire is being forced throughout its extent into engagement with its rim.

In practice, if desired in obdurate cases, a plurality of my devices may be used in a single operation, but that is a matter of preference that may be dictated by conditions.

What constitutes my invention will be hereinafter specified in detail and succinctly set forth in the appended claims.

In the accompanying drawing,

Figure I shows a segment of a wheel rim indicated partially in section with a portion of a tire applied thereto, and partially separated therefrom at one point and at that point held in separation by one of my devices set in position for tire displacement.

Figure II illustrates a portion of a wheel rim corresponding to that shown in Figure I, and showing a tire in the initial position for emplacement thereon wherein the tire is set in position for emplacement at one point, at which point my device is shown as fixed to the rim to hold the device thereat in place.

Figure III is a view of a portion of the subject matter of Figure II taken at right angles thereto and showing my device in side elevation.

Referring to the numerals on the drawing, 1 indicates a wheel rim provided with any usual or preferred inturned flanges 2 and 3, which may be provided for the engagement and holding of corresponding flanges 4 and 5 upon opposite sides of the slit 6 of a flexible or rubber tire 7, the slit 6 being such as is ordinarily provided in the outside covering or tread member of automobile tires. The foregoing description is presented for identification only of any usual or preferred rim and tire and as an example of those in common use.

My device, as shown, consists of a preferably bowed metallic stop member 9 that is preferably provided at opposite ends with rim engaging members. One of the rim engaging members consists of a cross-plate 10 of a length sufficient to overspan the space between the flanges 2 and 3 to effectually engage the same, the bar 10 terminating at one end in a toe-piece 11. 12 indicates an abutment screw threaded through an aperture in the cross-bar 10 and adapted by abutment against the bottom of the rim 1 to hold the device fixedly in place against the flanges 2 and 3, as shown in Figure I of the drawing.

The other rim engaging member of my device consists in complementary jaws 15 and 16 separated by a recess 17 of contour conformable to the flanges 2 or 3, as clearly shown in Figure II of the drawing.

It may be observed that the concavity of the member 9 is shown reversed in disposition to the rim 1 in Figures I and II of the drawing, respectively, and that, in those respective positions, they serve to engage the tire to best advantage. In the tire displacing position, as shown in Figure I, the member 9 supports the tire a little below one edge of the rim. In Figure II, the member 9 is shown as presenting the tire at one point in position of adjustment to which the entire tire is designed ultimately to be brought.

It is conceived that the member 9 might be made to operate by a single rim engaging member instead of the two which I have described, but there are advantages, as above suggested, in the use of the two on account of which I give preference to their employment.

The operation of my invention may be briefly described as follows. If it is to be employed in the displacement of a tire, the tire is lifted by any suitable means, such, for example, as an ordinary screwdriver or any stout lever of that kind which may serve for prying and lifting. When by the use of such tool the tire is separated from the rim at one point so as to sufficiently expose the rim as shown in Figure I, the bar 10 is slipped into place within the rim, as shown in Figure I, and is secured by manipulation of the screw 12. Afterwards the stripping operation of the tire may be continued conveniently and expeditiously until the tire is separated from the rim.

In the case of emplacement, as shown in Figure II, the rim 1 may be laid upon the ground and the tire to be applied to it bent down at one point until it is brought into proper disposition to the rim for emplacement. Thereupon, the jaws 15 and 16 are set to engage the flange 3 for instance as shown in Figure II. When in place, it holds the tire at the point of engagement described against slipping or upspringing movement and the work of emplacement may be thereupon carried forward expeditiously and with the least labor. In this connection, it is convenient to note again the preference above expressed for providing the member 9 with two rim engaging members, because it will now be clearly apparent from the last description that the jaws 15 and 16 lend themselves most conveniently to application of my device to the flange 3 when the tire is in the position illustrated in Figure II.

What I claim is:

1. A tool for holding a tire in a desired relation to the plane of a rim, having a tire engaging surface, and means having a mere hook and shoulder interlocking engagement with the rim for interchangeably engaging the tool to the rim with said surface facing in opposite directions, said surface in both positions being adjacent the same edge of the rim.

2. A tool for holding a tire in a desired relation to the plane of a rim, having a longitudinally curved tire engaging surface, and means having a mere hook and shoulder interlocking engagement with the rim for interchangeably engaging the tool to the rim with said surface facing in opposite directions, said surface in both positions being adjacent the same edge of the rim.

3. A tool for holding a tire in a desired relation to the plane of a rim, having a longitudinally curved concave tire engaging surface, means having interlocking engagement with the rim, with said concave surface engaging one side of the tire, and means having an interlocking engagement with the rim with said surface facing in the opposite direction and engaging the opposite side of the tire, said surface in both positions being adjacent the same edge of the rim.

4. A tool for holding a tire in a desired relation to the plane of a rim having a longitudinally curved concave tire engaging surface, means having interlocking engagement with the rim, with said concave surface engaging one side of the tire, and means having an interlocking engagement with the rim, with said surface facing in the opposite direction and engaging the opposite side of the tire, said surface in both positions being adjacent the same edge of the rim.

5. A tool for holding a tire in a desired relation to the plane of a rim having a tire engaging surface, and means for interchangeably engaging the rim with said surface facing in opposite directions and engaging opposite sides of the tire adjacent the same edge of the rim, said means comprising a cross bar at one end of the tire engaging surface adapted to overspan the space between the flanges of a rim, an abutment screw in the cross bar, and a pair of jaws adapted to engage one flange of the rim.

In testimony whereof, I have hereunto set my hand in the presence of two subscribing witnesses.

JOHN SCHMITT.

Witnesses:
JOSEPH L. ATKINS,
JOHN B. CLELAND.